No. 731,860. PATENTED JUNE 23, 1903.
T. & W. L. COLE.
MACHINE FOR MAKING BRICK OR THE LIKE.
APPLICATION FILED JUNE 13, 1902.
NO MODEL. 5 SHEETS—SHEET 1.

Witnesses:

Inventors
Thomas Cole
William L. Cole
By James L. Norris.
Atty

No. 731,860. PATENTED JUNE 23, 1903.
T. & W. L. COLE.
MACHINE FOR MAKING BRICK OR THE LIKE.
APPLICATION FILED JUNE 13, 1902.
NO MODEL. 5 SHEETS—SHEET 3.

Witnesses:

Inventors
Thomas Cole
William L. Cole
By James L. Norris
Atty.

No. 731,860. PATENTED JUNE 23, 1903.
T. & W. L. COLE.
MACHINE FOR MAKING BRICK OR THE LIKE.
APPLICATION FILED JUNE 13, 1902.
NO MODEL. 5 SHEETS—SHEET 4.
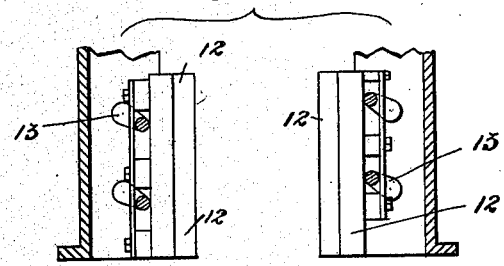
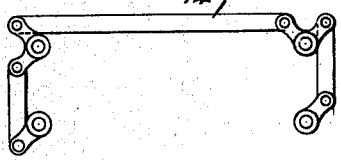
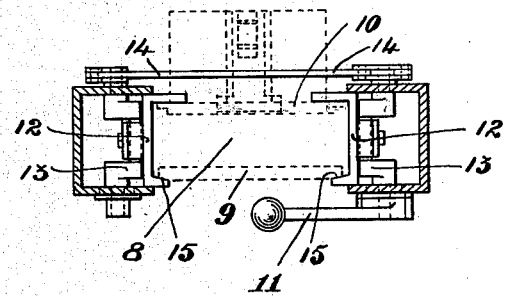

No. 731,860. PATENTED JUNE 23, 1903.
T. & W. L. COLE.
MACHINE FOR MAKING BRICK OR THE LIKE.
APPLICATION FILED JUNE 13, 1902.
NO MODEL. 5 SHEETS—SHEET 5.
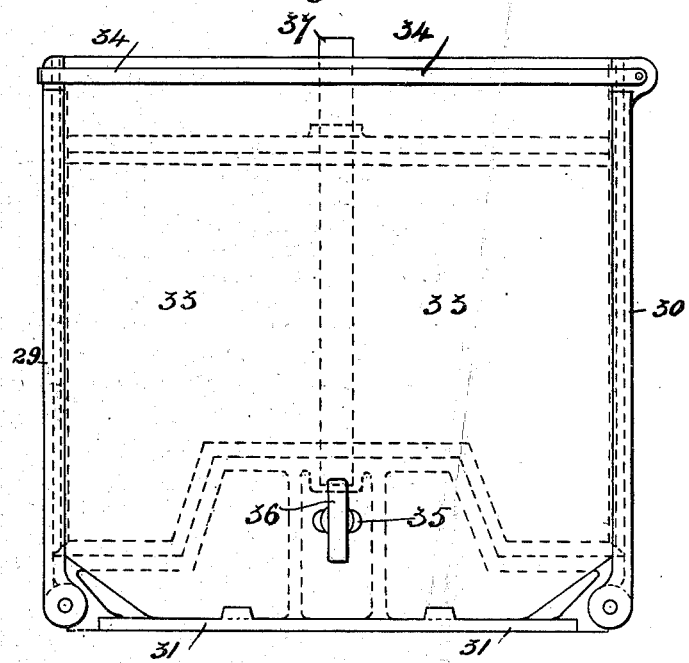
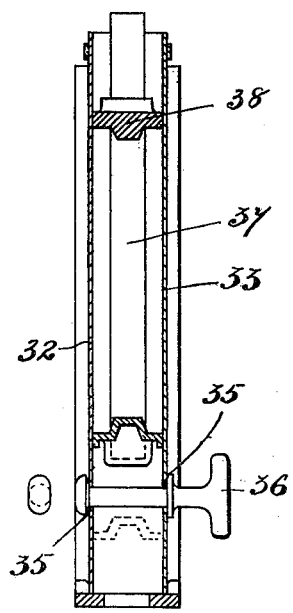
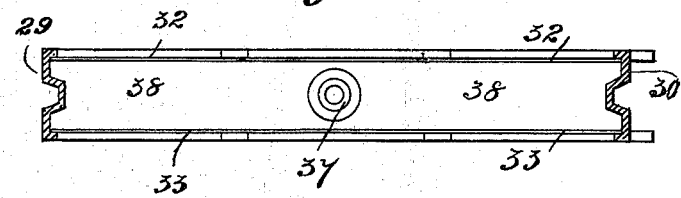
Witnesses:
Inventors
Thomas Cole
William L. Cole
By
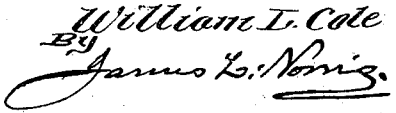
Atty.

No. 731,860.

Patented June 23, 1903.

UNITED STATES PATENT OFFICE.

THOMAS COLE AND WILLIAM LAWES COLE, OF LONDON, ENGLAND.

MACHINE FOR MAKING BRICK OR THE LIKE.

SPECIFICATION forming part of Letters Patent No. 731,860, dated June 23, 1903.

Application filed June 13, 1902. Serial No. 111,531. (No model.)

*To all whom it may concern:*

Be it known that we, THOMAS COLE and WILLIAM LAWES COLE, subjects of the King of Great Britain, residing at Park Road Iron Works, St. Ann's Road, Burdett Road, Bow, London, England, have invented certain new and useful Improvements in Machines for Making Brick or the Like, of which the following is a specification.

The object of this invention is to so construct a machine that a mold can be filled with the necessary material from a hopper or other filler, a head-piece being then placed on top of the material to form the top of brick. The material is then jogged or shaken to be solidified and settled in the mold and get rid of any air-bubbles which may be created during the filling of the mold, the mold being afterward placed in a frame or casing, which is actuated to grip the sides and support the back and front of the mold, and the material pressed by a press-head, the mold being afterward removed and laid on its side and opened out, so that the brick or slab can be removed on one of the sides of the mold, and so preserve its shape.

Our invention will be clearly understood from the following description, aided by the accompanying drawings, in which—

Figure 1:
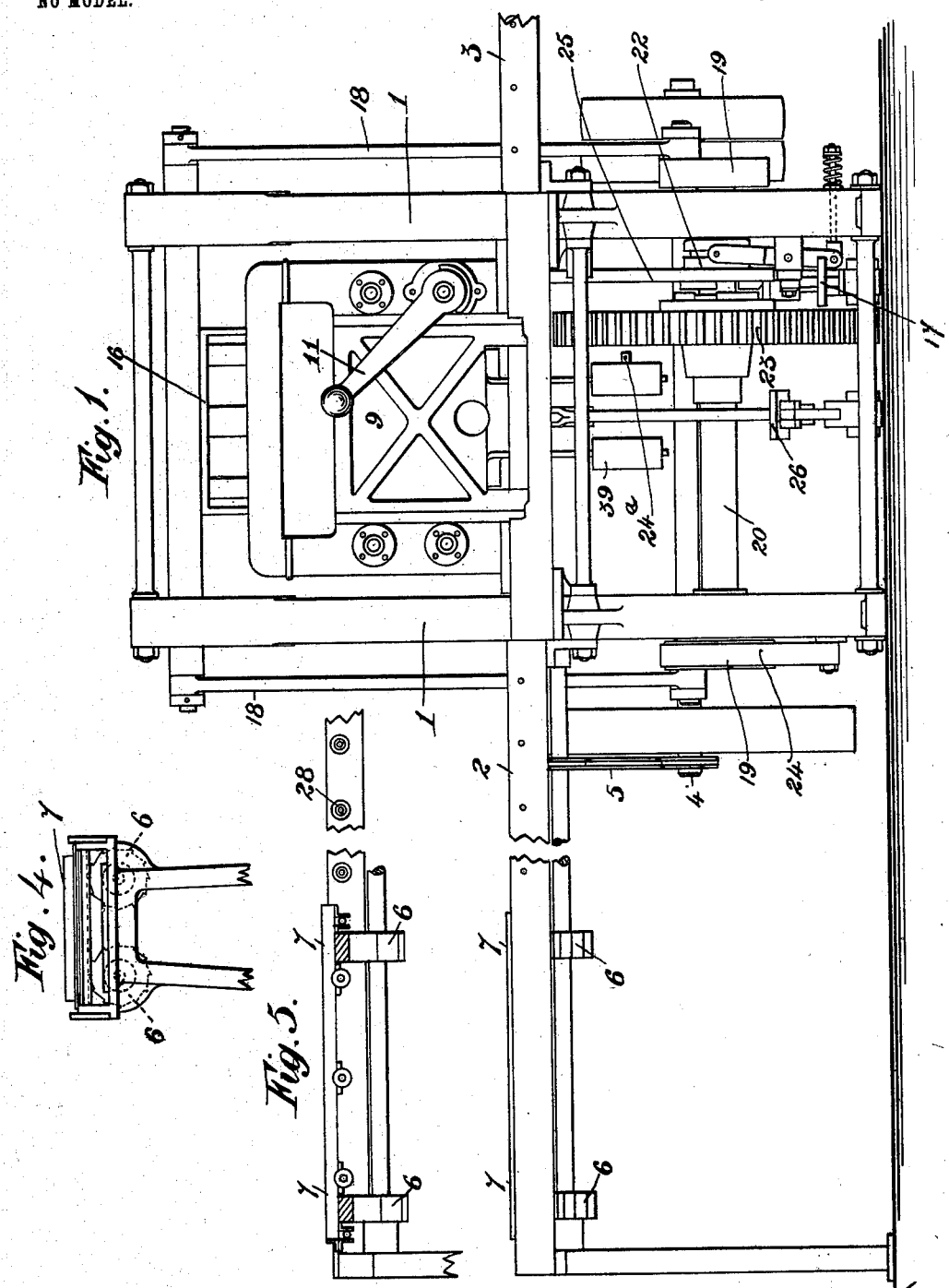
Figure 2:
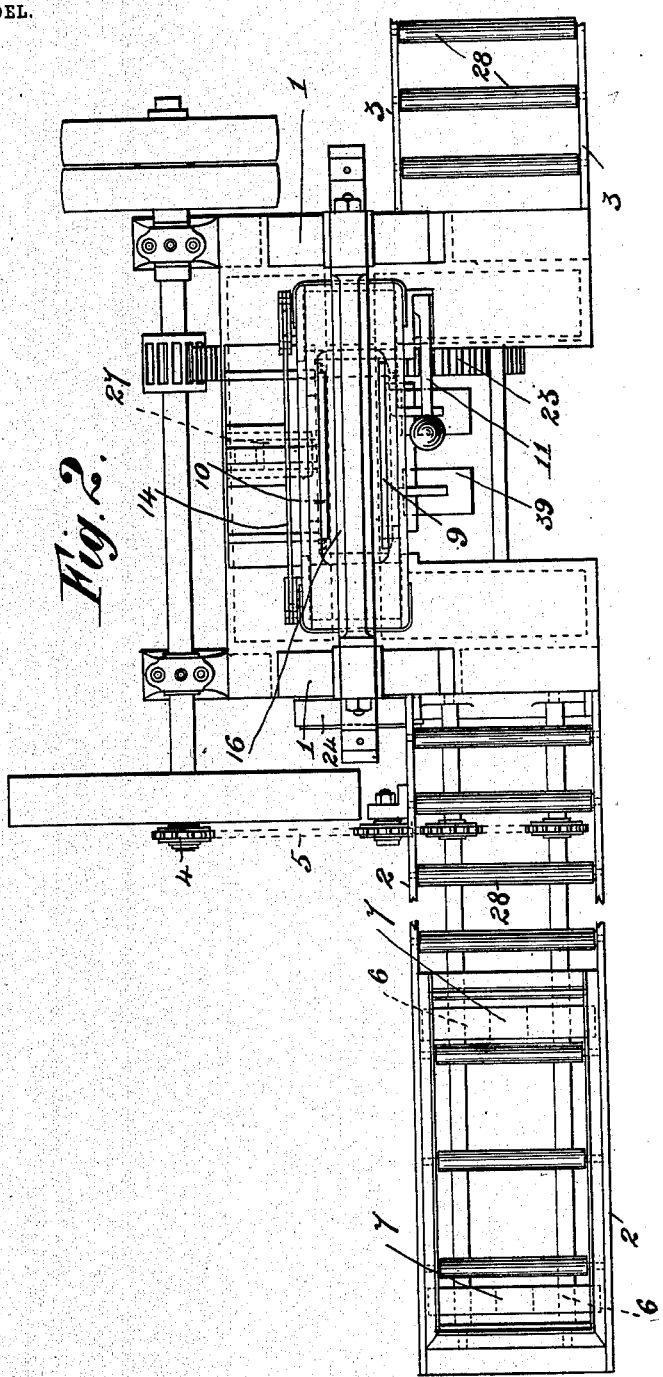
Figure 3:
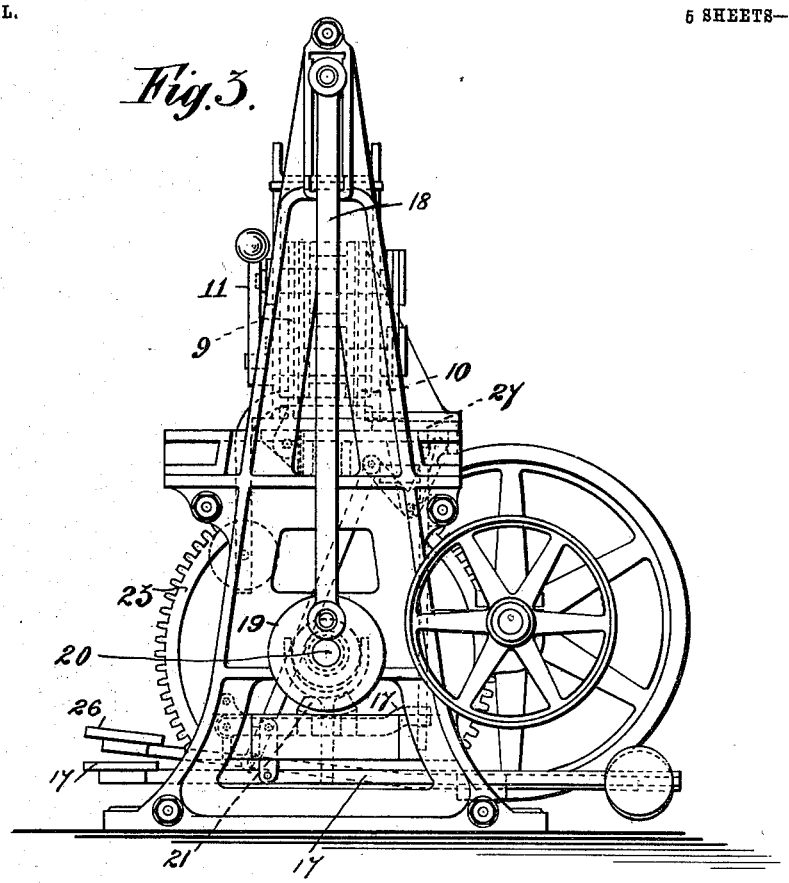
Figure 9:
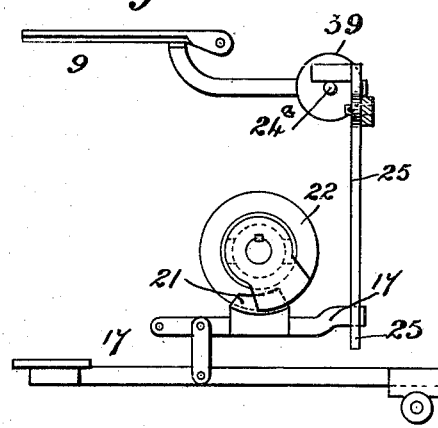
Figures 10, 11:
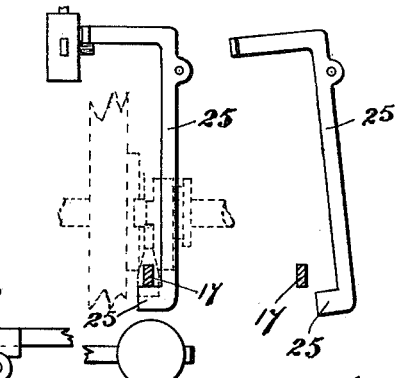

Figure 1 is a front view, and Fig. 2 a plan, of our apparatus, the side tables being broken away. Fig. 3 is a side view of the main portion of the machine, the side tables being removed; Figs. 4 and 5, part sectional end and side elevations of the jogging-table. Fig. 6 is a part sectional elevation showing the cranks for moving the pieces for gripping the mold; Fig. 7, a plan of same, showing also the handle and the back and flap in dotted lines. Fig. 8 is a view of the crank mechanism for operating the gripping devices. Fig. 9 is a side elevation of the front flap and mechanism for arresting the foot-pedal and holding it while the flap is down. Fig. 10 is a front view of the arresting-lever holding the foot-pedal. Fig. 11 is a front view of the arresting-lever released from the foot-pedal ready for the pedal to be operated. Fig. 12 is a front view of the mold in a complete form. Fig. 13 is a side section, and Fig. 14 a sectional plan, of the mold.

For the purpose of this invention we construct standards 1 for containing the principal operating parts, with tables 2 3 on either side, and from a gear-wheel 4, Fig. 2, we drive by chain 5 or otherwise two or more ratchet or other wheels 6, Figs. 1, 4, and 5, capable of giving a jogging motion to a plate or slab 7, on which the mold is stood for filling, the jogging thoroughly settling and amalgamating the material and disposing of any air-bubbles which may be contained therein. The mold, Fig. 12, being filled to the desired height and having been sufficiently acted upon by the jogging-slab, the cover is then placed therein and the mold removed to between the standards 1 and placed in the frame 8. The portion of the tables between and in front of the standards 1 is hinged as a flap 9 and is now lifted by the operator to abut against one side of the mold, the other sides of the mold having an abutment against a fixed plate or wall 10. A handle or lever 11 is now actuated, and movable pieces 12 are brought by cranked levers 13 and rods 14 or gear into contact with the ends of the mold and angled edges 15 of the folding-flap portion 9 of the tables, so as to grip and engage same and form a frame to the mold for resisting all strain of the press-head 16 and preserving the shape of the mold. A foot or hand lever 17 is now actuated and the press-head 16 lowered to compress the contents of the mold and expel surplus moisture. This lowering and returning of the press-head 16 is only effected after pressure of the foot-lever 17, the press-head 16 being connected by rods 18 to crank-disks 19 on the shaft 20, so that the lever 17 on being pressed operates a wedge-cam 21 and moving it clear of a clutch 22, so that same can engage with the driving-wheel 23 by a spring for actuating the press-head 16, the wedge-cam 21 returning to its normal condition for engagement in an opening in the clutch, so that by the time the press-head 16 has been lowered and raised the clutch 22 will have become again engaged with the wedge-cam 21 and be shifted out of gear with the driving-wheels 23, whereby the action of the press-head 16 will be stopped, this being further insured from moving by a permanent friction or other brake 24 on the crank-disk 19. The operator now reverses the first-mentioned lever 11 and frees the table-flap 9 and causes the side pieces 12 to retire. He now lowers the flap 9, and the stop 24ª on one weight of the balance-lever 39 acts on the lever 25 and automatically places its end under the foot-lever 17, which actuates the clutch 22 and effectually prevents the clutch mechanism being thrown into gear while the front flap 9 is down, so that the press-head cannot be actuated until the flap 9 is raised, and by operation on another foot-lever 26 operates a piece 27, forming part of the resistance-wall 10, and this strikes the bottom of the mold and pushes it out, so that on the operator catching hold of the key of the mold he can easily remove the mold from the framing. This knocking or kicking of the box, in addition to rendering the box easy of removal, somewhat frees the sides of the mold from the material and prevents sticking, so that the brick or slab when sufficiently dry can be readily removed. The mold hereinafter described is then passed onto the table 3 to another operator, who removes the tube and the key of the mold, lays the mold upon its side, preferably upon a raised portion of the table, unlocks the edges, and folds same back, then removing the top side and afterward the edges, so that the brick or slab is lying on the now bottom side plate, which, with the brick, can be lifted by the operator and carried to another part of the building for proper drying and setting, thus keeping the brick or slab in its proper shape.

The mold Fig. 12 is made with the two ends 29 30 hinged to the bottom 31, the interior surfaces conforming to the shape of the edge of the brick intended, the sides 32 33 of the mold being made of sheet-iron and fitting in recesses in the edges of the ends, these being kept in place by a wire loop 34 or other means. The sides 32 33 of the mold are provided with holes 35, through which a key 36 is passed to engage the sides 32 33 and prevent bulging outward while on the jogging-table 7, the handle of the key 36 acting as a means for assisting the operator in manipulating the mold on the table. A tube 37 is fitted to the bottom of the mold and engages the other end of the mold after the required quantity of cement or concrete is placed therein. The tables are provided with rollers 28 for easy manipulation of the molds.

The tube 37 may be dispensed with and the inside of the edges, bottom, and top or sides of the mold be of a shape to suit the formation of the brick or slab whether of the ordinary or of the interlocking kind.

The fixed wall or plate 10 of the frame 8 is detachably connected to said frame and can be readily removed for affixing of another of greater or lesser thickness to suit the thickness of mold.

The folding flap 9 is provided with balancing-weights 39 to render the movement easier for the operator.

What we claim, and desire to secure by Letters Patent, is—

1. In a machine for making brick and the like, a mold-receptacle having a stationary back, adjustable sides and a folding front, mechanism for locking the walls of said receptacle in closed position, and a press-head arranged to descend into said receptacle.

2. In a machine for making brick and the like, a reciprocating press-head, a lever controlling the operation of said press-head, a mold-receptacle having a stationary back, adjustable sides and a folding front, said folding front being provided with a counterweight, mechanism for locking said mold-receptacle in closed position, and means operated by the opening of said mold-receptacle for locking said lever to prevent the operation of said press-head.

3. In a machine for making bricks and the like, a mold-receptacle, having a folding front to permit the insertion and withdrawal of a mold, a press-head arranged to descend into said mold-receptacle, a lever pivoted to the rear wall of said receptacle, for pushing outward the mold contained therein, and means for operating said lever.

4. In a machine for making bricks and the like, an operating mechanism, a reciprocating presser-head, a mold-receptacle, a jogging-table, and ratchet-wheels actuated by said operating mechanism, for operating said jogging-table.

5. In a machine for making bricks and the like, an operating mechanism, a reciprocating press-head, a mold-receptacle comprising a stationary back, adjustable sides and a folding front, said folding front having a counterweight, a lever-actuated mechanism for locking said mold-receptacle in closed position, a clutch mechanism for actuating said press-head from said operating mechanism, a lever controlling said clutch mechanism, means for locking said last-mentioned lever when said mold-receptacle is opened, and a jogging-table actuated by said operating mechanism.

In testimony whereof we have hereunto set our hands in presence of two subscribing witnesses.

THOMAS COLE.
WILLIAM LAWES COLE.

Witnesses:
WM. O. BROWN,
FRED C. SMITH.